(12) United States Patent
Meruva

(10) Patent No.: US 9,263,032 B2
(45) Date of Patent: Feb. 16, 2016

(54) VOICE-RESPONSIVE BUILDING MANAGEMENT SYSTEM

(71) Applicant: Honeywell International Inc., Morristown, NJ (US)

(72) Inventor: Jayaprakash Meruva, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 14/062,528

(22) Filed: Oct. 24, 2013

(65) Prior Publication Data

US 2015/0120297 A1    Apr. 30, 2015

(51) Int. Cl.
*G10L 15/06* (2013.01)
*G10L 15/19* (2013.01)
(Continued)

(52) U.S. Cl.
CPC .............. *G10L 15/063* (2013.01); *G06F 3/167* (2013.01); *G10L 15/19* (2013.01); *G10L 15/22* (2013.01); *G10L 17/22* (2013.01)

(58) Field of Classification Search
CPC ....... G10L 15/07; G10L 17/04; G10L 15/065; G10L 15/142; G10L 15/02; G10L 15/06; G10L 17/00; G10L 15/063; G10L 15/144; G10L 17/26; G10L 2015/0631; G10L 15/1815; G10L 15/183; G10L 15/26; G10L 15/00; G10L 15/005; G10L 15/14; G10L 15/18; G06F 17/277; G06F 17/27; G06F 17/2705; G06F 17/278; G06F 17/30684; G06F 17/30705; G06F 17/248; G06F 17/2715; G06F 17/2735; G06F 17/2765; G06F 17/30616

USPC ........ 704/231, 235, 243, 244, 246, 247, 249, 704/250, 251, 255, 257, 270
See application file for complete search history.

(56) References Cited

U.S. PATENT DOCUMENTS 5,677,989 A * 10/1997 Rabin et al. ................... 704/246
7,689,416 B1    3/2010 Poirier
(Continued)

FOREIGN PATENT DOCUMENTS

JP    2009237439    10/2009

OTHER PUBLICATIONS

Joern Ploennigs, et al. Generation of Adapted, Speech-based User Interfaces for Home and Building Automation Systems. Factory Communication Systems, 2008. WFCS 2008. IEEE International Workshop. pp. 445-452.

(Continued)

*Primary Examiner* — Huyen Vo
(74) *Attorney, Agent, or Firm* — Brooks, Cameron & Huebsch, PLLC

(57) ABSTRACT

A voice-responsive building management system is described herein. One system includes an interface, a dynamic grammar builder, and a speech processing engine. The interface is configured to receive a speech card of a user, wherein the speech card of the user includes speech training data of the user and domain vocabulary for applications of the building management system for which the user is authorized. The dynamic grammar builder is configured to generate grammar from a building information model of the building management system. The speech processing engine is configured to receive a voice command or voice query from the user, and execute the voice command or voice query using the speech training data of the user, the domain vocabulary, and the grammar generated from the building information model.

18 Claims, 3 Drawing Sheets

(51) Int. Cl.
*G10L 17/22* (2013.01)
*G06F 3/16* (2006.01)
*G10L 15/22* (2006.01)

(56) References Cited

U.S. PATENT DOCUMENTS

| 7,716,056 | B2 | 5/2010 | Weng et al. |
| 2005/0283367 | A1 | 12/2005 | Ativanichayaphong et al. |
| 2008/0154604 | A1 | 6/2008 | Sathish et al. |
| 2009/0150156 | A1* | 6/2009 | Kennewick et al. ........... 704/257 |
| 2009/0171660 | A1* | 7/2009 | Jian et al. ...................... 704/246 |
| 2012/0249328 | A1* | 10/2012 | Xiong ............................ 340/541 |
| 2014/0075570 | A1* | 3/2014 | Hsu et al. ........................ 726/28 |

OTHER PUBLICATIONS

Oliver Lemon, et al. "Build Your Own" Spoken Dialogue Systems: Automatically Generating ISU Dialogue Systems from Business User Resources. Coling 2008: Companion volume—Posters and Demonstration, pp. 161-164. Manchester, Aug. 2008.

* cited by examiner

VOICE-RESPONSIVE BUILDING MANAGEMENT SYSTEM

TECHNICAL FIELD

The present disclosure relates to a voice responsive building management system.

BACKGROUND

Building information modeling (BIM) can refer to the generation and/or management of data associated with a building (e.g., data associated with the components, equipment, and/or properties of the building). For example, BIM data can include architectural, mechanical, electrical, plumbing, sanitary, fire, geometrical, and/or spatial information associated with a building.

BIM data associated with a building can be used to generate a user interface for a building management system (BMS) for the building, which can be displayed to a user (e.g., operator or service technician) and used to monitor and/or control the building. For example, the user of a BMS can check and/or set the state of a control component(s), equipment, device(s), network (s) area(s), and/or space(s) of the building using the BMS. The user interface of the BMS with multiple views can include, for example, the floor plan of the building, with additional information about the building (e.g., information about a device(s) of the building, information about a control network(s) of the building, schematic graphics of the building, etc.) overlaid on the floor plan. The BMS (e.g., the user interface displayed to the user) can be two or three-dimensional.

However, previous BMSs, and previous three-dimensional BMSs in particular, may be difficult and/or time consuming to use. For example, the user may have to perform a large number of steps in previous BMSs to navigate to the location (e.g., area and/or space) of the building the user would like to view and/or to obtain the information about the building the user would like to know. For instance, the user may have to issue a large number of commands (e.g., clicks) to previous BMSs (e.g., using the mouse, keyboard, and/or touchpad of the user interface of the BMS) to navigate to the targeted building location and/or obtain the wanted building information, which can make it difficult and/or time consuming for the user to navigate to the targeted building location and/or obtain the wanted building information.

DETAILED DESCRIPTION

Figure 1:
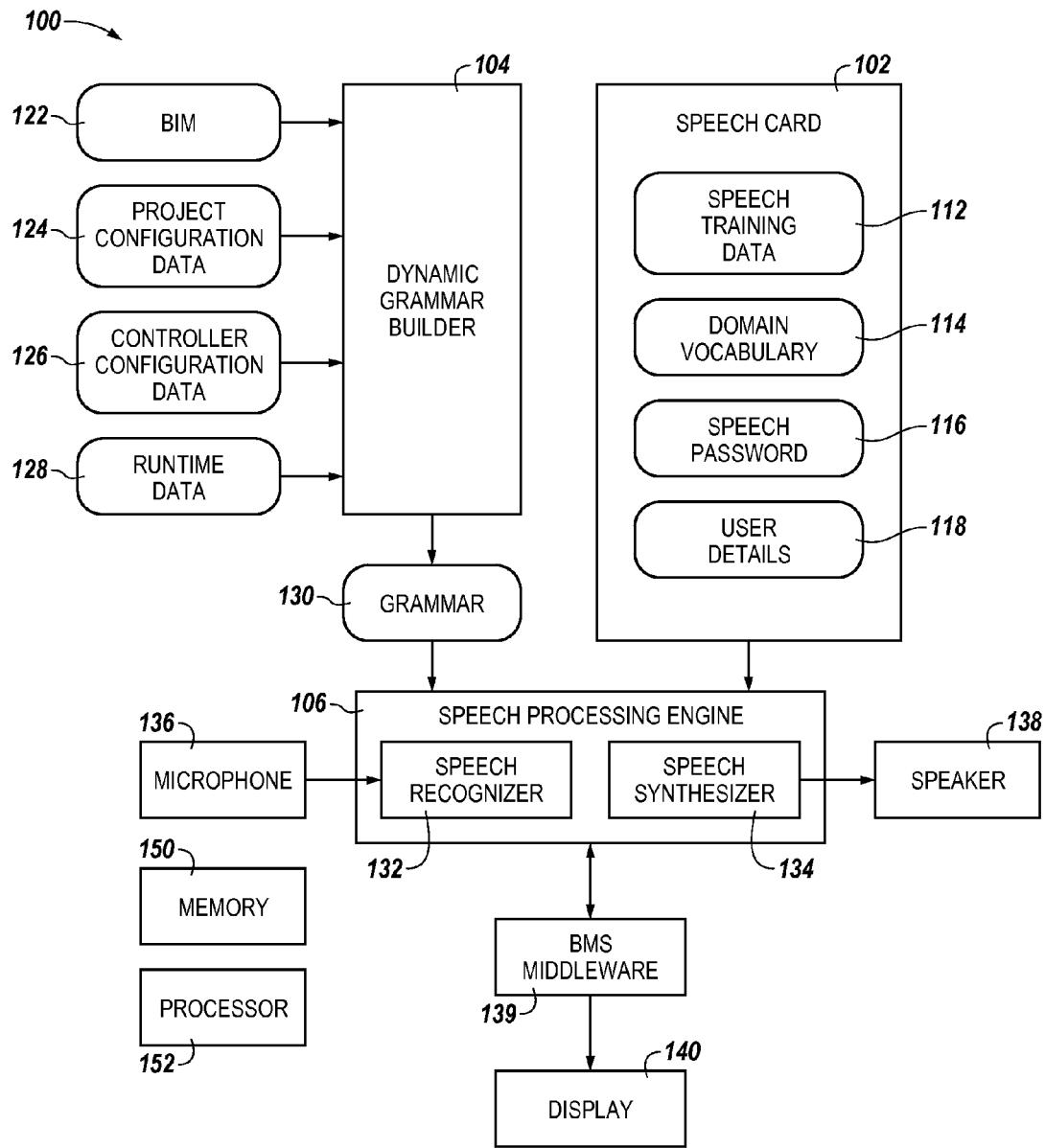
FIG. 1 illustrates a voice-responsive building management system in accordance with one or more embodiments of the present disclosure.

A voice-responsive building management system is described herein. For example, one or more embodiments include an interface, a dynamic grammar builder, and a speech processing engine. The interface is configured to receive a speech card of a user, wherein the speech card of the user includes speech training data of the user and domain vocabulary for applications of the building management system for which the user is authorized. The dynamic grammar builder is configured to generate grammar from a building information model of the building management system. The speech processing engine is configured to receive a voice command or voice query from the user, and execute the voice command or voice query using the speech training data of the user, the domain vocabulary, and the grammar generated from the building information model.

A voice-responsive building management system (e.g., a three-dimensional voice-responsive building management system) in accordance with embodiments of the present disclosure may be easier and/or less time consuming to use than previous building management systems (e.g., previous three-dimensional building management systems). For example, a user of a voice responsive building management system (BMS) in accordance with embodiments of the present disclosure may have to perform less steps than in previous BMSs to navigate to the location (e.g., area and/or space) of the building the user would like to view and/or to obtain the information about the building the user would like to know. For instance, the user may have to issue only a single voice command or a single voice query to a voice-responsive BMS in accordance with embodiments of the present disclosure to navigate to the targeted building location and/or obtain the wanted building information, which can make it easy and/or quick for the user to navigate to the targeted building location and/or obtain the wanted building information.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of components" can refer to one or more components.

FIG. 1 illustrates a voice-responsive building management system (BMS) 100 in accordance with one or more embodiments of the present disclosure. BMS 100 can be used (e.g., by a user) to manage (e.g., monitor and/or control) a building. For example, the user can check and/or set the state of a control component(s), equipment, device(s), network (s) area(s), and/or space(s) of the building using BMS 100.

BMS 100 can be part of a computing device such as, for instance, a laptop computer, a desktop computer, or a mobile device (e.g., a mobile phone, a smart phone, a personal digital assistant, etc.), among other types of computing devices. For example, BMS 100 can be part of a BMS workstation or BMS touch panel that can be wired connected or wirelessly connected to the BMS system.

BMS 100 can be a standalone BMS that can operate without internet connectivity (e.g., without being connected to the internet). That is, BMS 100 can perform one or more embodiments of the present disclosure without using the internet.

BMS 100 can include (e.g., be interfaced with) an interface that can receive a speech card (e.g., speech card 102 illustrated in FIG. 1) of a user. The user can be, for example, an operator or service technician of BMS 100. The interface can be, for example, a card holder interface and/or a card reader interface. The interface is not shown in FIG. 1 for simplicity and so as not to obscure embodiments of the present disclosure.

Speech card 102 can be a memory card such as, for instance, a secure digital (SD) card, a universal serial bus (USB) flash drive (e.g., stick), or a near field communication (NFC) card. However, embodiments of the present disclosure are not limited to a particular type of memory card. Further, in some embodiments, speech card 102 can be part of a mobile device (e.g., a mobile device of the user of BMS 100).

Speech card 102 can be a speech ontology card of the user. For example, as shown in FIG. 1, speech card 102 can include (e.g., store) speech training data 112 of the user and domain vocabulary 114 for applications of BMS system 100 for which the user is authorized. Such BMS system applications can include, for example, ComfortPoint Open, Enterprise Buildings Intergrator, and/or Experion. However, embodiments of the present disclosure are not limited to a particular BMS application(s).

Speech training data 112 can be in the form of flat files, and can include speaker voice variations associated with the user. For example, speech training data 112 can include user recognition related information such as, for instance, accent, pitch, frequency, and/or speed at which the user speaks that helps a recognition engine to recognize words spoken by the user. The type of speech training data, and the way the data is packaged and maintained, can vary based on the recognition engine.

Domain vocabulary 114 can include a pronunciation lexicon and/or grammar recognition for (e.g., specific to) the user and/or the applications of BMS 100 for which the user is authorized. For example, domain vocabulary 114 can include a user and BMS application pronunciation lexicon, which can be a repository of words and word-related information such as pronunciations and parts of speech. For instance, domain specific terms, such as, for instance, "AHU", VAV", or "HVAC", may be pronounced differently in different regions and/or by different users, and the particular pronunciation of these terms by the user can be part of domain vocabulary 114. As an additional example, domain vocabulary 114 can include generally fixed grammar suitable for the applications of BMS 100. For instance, "show or display alarms" can display an alarm page of the application, or "show first urgent alarm details" can display the first urgent alarm details page in the BMS system, both of which will not change based on project.

As shown in FIG. 1, speech card 102 can include speech password 116. Speech password 116 can be used to recognize and/or authorize the user through speech (e.g., BMS system 100 can recognize and/or authorize the user through the user speaking the password). The content of speech password 116 can be determined by a speech generation algorithm.

As shown in FIG. 1, speech card 102 can include (e.g., store) details 118 of the user. User details 118 can include, for example, the identity of the user (e.g., the user's name and/or identification (ID) number), the language(s) spoken by the user (e.g., English, etc.), the email address of the user, the time period for which speech card 102 is valid for the user (e.g., the date the validity of speech card 102 expires), the role of the user, and/or the applications of BMS 100 for which the card can be used by the user.

In some embodiments, speech card 102 (e.g., speech training data 112, domain vocabulary 114, and/or user details 118 of speech card 102) can be encrypted such that only the applications of BMS 100 for which the user is authorized can decrypt and use speech card 102. For example, speech card 102 can be encrypted with a private key.

As an example, when the interface receives speech card 102 (e.g., when speech card 102 is inserted into the interface by the user), BMS 100 (e.g., speech processing engine 106 shown in FIG. 1) can detect the presence of speech card 102, decrypt speech card 102 (e.g., the encrypted speech training data 112, domain vocabulary 114, and/or user details 118 of speech card 102), authorize the user, and load speech training data 112, domain vocabulary 114, and/or user details 118 from speech card 102.

In some embodiments, speech card 102 can be issued to the user during a training period or when the user is issued his or her license. Speech card 102 can be issued using a speech card formatter application on the card issuer's computing device (e.g., laptop), which can be a standalone or web based application. For example, the card issuer can select the applications of BMS 100 for which the user will be authorized, enter user details 118 into the speech card formatter application, and insert speech card 102 into his or her computing device. The speech card formatter application can detect and display (e.g., show) the inserted card, and the card issuer can select the formatting for speech card 102 and issue a format command. The speech card formatter application can then format speech card 102, and copy encrypted user details 118 and encrypted domain vocabulary 114 for the authorized BMS applications from the card issuer's computing device to speech card 102. Formatted speech card 102 can then be removed from the card issuer's computing device.

Speech training data 112, however, may not be copied to speech card 102 while formatting speech card 102 using the speech card formatter application, because the speech training data may not be available on the card issuer's computing device. Rather, the user can use his or her computing device to train himself or herself with available speech tutorials. Once the user's training data is available in his or her computing device, the training data can be copied to speech card 102.

When used as a web-application, speech training data 112 can be copied to speech card 102, or maintained (e.g., stored) in a server of a cloud-based computing system. in such embodiments, the user can download and copy speech training data 112 to speech card 102 any time from the cloud. The user's speech training data may also be uploaded and maintained by the cloud.

In some embodiments, all of the information (e.g., data) stored on speech card 102 (e.g., speech training data 112, domain vocabulary 114, speech password 116, and user details 118) can be downloaded to BMS 100 from the a server of a cloud-based computing system if internet connectivity is available to BMS 100, so that the information is available to BMS 100. Further, BMS 100 can upload data to the cloud if there is a change in the data (e.g., if there is a change in speech training data 112).

As shown in FIG. 1, BMS 100 can include dynamic grammar builder 104. Dynamic grammar builder 104 can generate grammar (e.g., speech recognition grammar) 130 from a building information model (BIM) 122 of BMS 100, project configuration data 124 associated with BMS 100, controller configuration data 126 associated with BMS 100, and/or runtime (e.g., operational) data 128 associated with BMS 100, as illustrated in FIG. 1.

BIM 122 can be a three-dimensional building information model that includes building information modeling data associated with the building managed by BMS 100. The building information modeling data can include data associated with (e.g., quantities, properties, and/or statuses of) the components (e.g., control components), equipment, devices, networks (e.g., control networks), areas, spaces, and/or properties of the building. For example, the building information modeling data can include architectural, mechanical, electrical, plumbing, sanitary, fire, geometrical, and/or spatial (e.g., spatial relationship) information associated with the building.

For example, BIM 122 can include a floor plan (e.g., an architectural layout, such as an area, floor and/or room layout) of the building and HVAC devices (e.g., HVAC equipment) in (e.g., located and/or used in) the building, among other types of building information modeling data. The HVAC devices in the building can include, for example, a chiller(s) (e.g., chiller plant), boiler(s) (e.g., boiler plant), pump(s), fan(s), air damper(s) such as a variable air volume (VAV) damper, air handling unit(s) (AHUs) (e.g., AHU plant), coil(s) such as a heating and/or cooling coil, air filter(s), and/or cooling tower(s), among other HVAC devices.

BIM 122 (e.g., the building information modeling data of BIM 122) can be generated and/or managed by a building information modeling process (which can also be referred to as BIM). Such a BIM process can include, for example, representing a design as objects—vague and undefined, generic or product-specific, solid-shapes or void-space oriented (e.g., like the shape of a room)—that carry their geometry, relations, and/or attributes. BIM design tools can allow for extracting different views from a building model for drawing production and other uses. These different views can be automatically consistent (e.g., the objects can all be of a consistent size, location, and/or specification) since each object instance may defined only once. Such a BIM process can use three-dimensional, real-time, dynamic building modeling software.

Project configuration data 124 can include terms specific to the projects (e.g., HVAC projects) associated with BMS 100, such as, for example, location names and/or location details of the building managed by BMS 100. Controller configuration data 126 can include the names of the controllers associated with BMS 100 (e.g., the controllers of the building managed by BMS 100), and/or HVAC applications, such as, for instance, AMU, VAV, and/or chiller applications, configured in the controllers. Runtime data 128 can include events and/or alarms that occur while BMS 100 is running (e.g., events and/or alarms detected by BMS 100), and/or live (e.g., current) details of the controllers, such as, for instance, the current status of the controller and/or input and output points such as sensors, actuators, or other devices. Examples of project configuration data, controller configuration data, and runtime data associated with BMS 100 will be further described herein.

In some embodiments, project configuration data 124 and/or controller configuration data 126 can be pre-loaded into BMS 100 during installation of BMS 100 (e.g., before runtime of BMS 100). In some embodiments, project configuration data 124 and/or controller configuration data 126 can be dynamically loaded (e.g., updated and/or discovered) into BMS 100 during runtime (e.g., operation) of BMS 100.

As shown in FIG. 1, BMS 100 can include speech processing engine 106. Speech processing engine 106 can receive a voice command or voice query (e.g., a single voice command or a single voice query) from the user. For example, the voice command or query can be received by microphone 136 of BMS 100 and supplied to speech recognizer 132 of speech processing engine 106, as illustrated in FIG. 1. Microphone 136 can be built into BMS 100 (e.g., into the BMS workstation or touch panel), or connected to BMS 100 (e.g., to the BMS workstation or touch panel) through wired or wireless (e.g., Bluetooth and/or Wi-Fi) headphones. Example voice commands and queries will be further described herein.

Speech processing engine 106 can execute (e.g., recognize, process, and respond to) the voice command or voice query using speech training data 112, domain vocabulary 114, and grammar 130 generated from BIM 122, project configuration data 124, controller configuration data 126, and/or runtime data 128. For example, speech processing engine 106 can display information associated with (e.g., the response to) the voice command or query to the user on display 140 of BMS 100 via BMS middleware 139 of BMS 100. For instance, speech processing engine 106 can recognize the voice command or query and send the interpreted command or query to BMS middleware 139, which can process the command or query and display the information associated with the command or query on display 140. Display 140 can be, for instance, the monitor (e.g., screen) of the BMS workstation or the screen of the BMS touch panel.

As an additional example, speech processing engine 106 can provide a voice response with information associated with the voice command or query to the user through speech synthesizer 134 of speech processing engine 106 and speaker 138 of BMS 100. For instance, speech processing engine 106 can supply speech synthesizer 134 with the response to the user's voice command or query in text format, and speech synthesizer can convert the text to the voice response and provide the voice response to the user through speaker 138. Speaker 138 can be built into BMS 100 (e.g., into the BMS workstation or touch panel), or connected to BMS 100 (e.g., to the BMS workstation or touch panel) through wired or wireless (e.g., Bluetooth and/or Wi-Fi) headphones (e.g., the same headphones through which microphone 136 is connected to BMS 100).

The information associated with the voice command or query that is displayed and/or provided to the user can include, for example, items (e.g., devices, controllers, equipment, locations, etc.) associated with BMS 100 (e.g., of the building managed by BMS 100), and/or data associated with (e.g., quantities, properties, and/or statuses of) those items. For instance, the voice command or query from the user can include a particular item or item(s) associated with BMS 100 (e.g., an item(s) the user would like information about), and speech processing engine 106 can display the item(s) (e.g., within the floor plan of the building) and/or data associated with the item(s) to the user on display 140, and/or provide a voice response with the data associated with the item(s) to the user through speech synthesizer 134 and speaker 138.

As an example, dynamic grammar builder 104 can extract details about different locations (e.g., reception area(s), chiller room(s), board room(s) conference room(s), etc.) of the building from BIM 122, and generate grammar for commands to go to those locations. When the user issues a voice command to go to a particular location of the building, such as, for instance, "go to chiller room", speech processing engine 106 can receive the command, recognize the location as the chiller room, translate this location to coordinates (e.g., 3-D coordinates), and switch the view displayed on display 140 to show the chiller room.

As an additional example, dynamic grammar builder 104 can generate grammar from project configuration data 124 and/or controller configuration data 126 for all controller names (e.g., AHU 1, main chiller, standby chiller, reception VAV, etc.) associated with BMS 100, which can be used for "show" or "display" commands from the user. When the user issues a command to "show" or "display" a particular controller, speech processing engine 106 can receive the command, recognize the command, and display the respective controller page on display 140.

As shown in FIG. 1, BMS 100 can include a memory 150 and a processor 152. Memory 150 can be any type of storage medium that can be accessed by processor 152 to perform various examples of the present disclosure. For example, memory 150 can be a non-transitory computer readable medium having computer readable instructions (e.g., computer program instructions) stored thereon that are executable by processor 152 to perform the functions of dynamic grammar builder 104 and/or speech processing engine 106 in accordance with one or more embodiments of the present disclosure.

Memory 150 can be volatile or nonvolatile memory. Memory 150 can also be removable (e.g., portable) memory, or non-removable (e.g., internal) memory. For example, memory 150 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Memory 150 can be located in BMS 100, or can be located internal to another computing resource (e.g., enabling computer readable instructions to be downloaded over the Internet or another wired or wireless connection).

Figure 2:
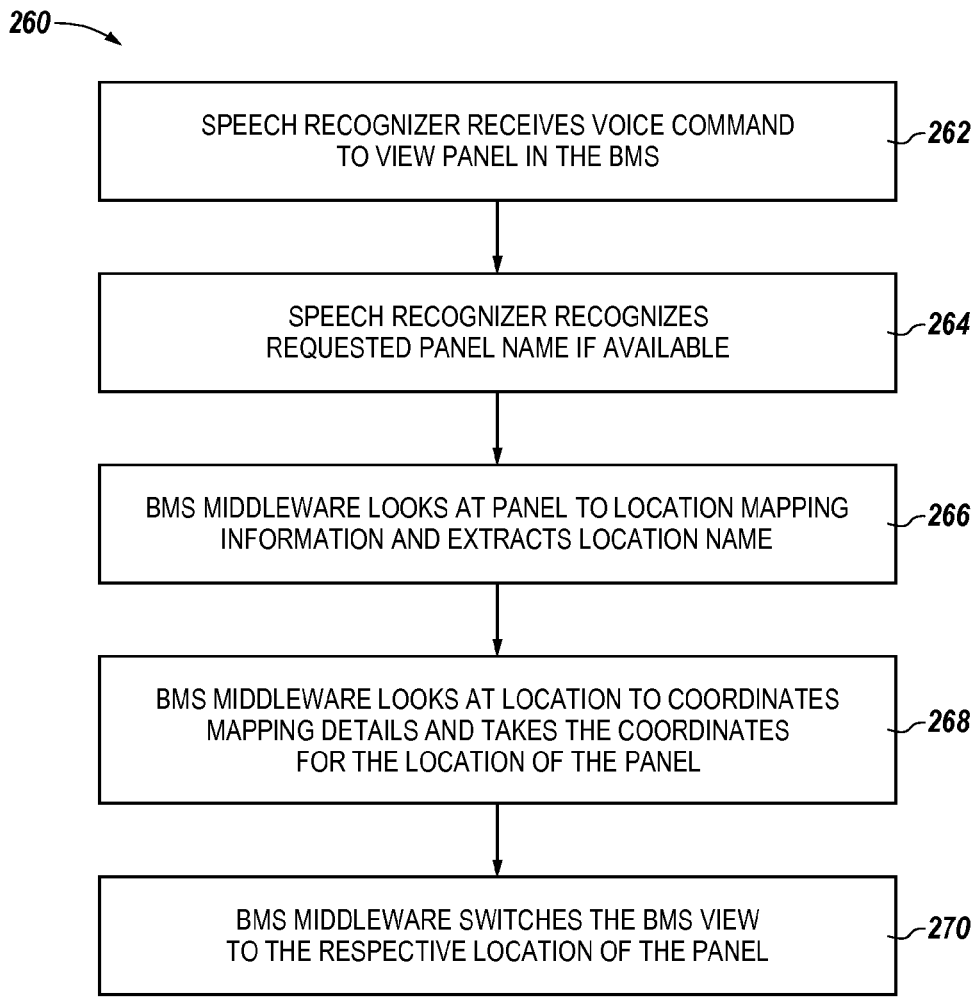
FIG. 2 illustrates a method for operating a voice-responsive building management system in accordance with one or more embodiments of the present disclosure.

FIG. 2 illustrates a method 260 for operating a voice-responsive BMS (e.g., voice-responsive BMS 100 previously described in connection with FIG. 1) in accordance with one or more embodiments of the present disclosure. Method 260 can translate a panel name associated with (e.g., in) the BMS to a location (e.g., 3-D location) associated with (e.g., in) the BMS. Method 260 can be performed by, for example, dynamic grammar builder 104 and/or speech processing engine 106 (e.g., speech recognizer 122 and/or speech synthesizer 134) previously described in connection with FIG. 1.

At block 262 of method 260, the speech recognizer receives a voice command (e.g., from a user of the BMS) to view a panel in the BMS. At block 264 of method 260, the speech recognizer recognizes the requested panel name if available in the BMS (e.g., a BIM of the BMS, such as BIM 122 previously described in connection with FIG. 1). At block 266 of method 260, BMS middleware (e.g., BMS middleware 139 previously described in connection with FIG. 1) looks at panel to location mapping information, and extracts the location name (e.g., from the BIM). At block 268 of method 260, the BMS middleware looks at location to coordinates mapping details, and takes the coordinates (e.g., 3-D coordinates) for the location of the panel. At block 270 of method 260, the BMS middleware switches the BMS view (e.g., the view displayed on a display of the BMS, such as display 140 previously described in connection with FIG. 1) to the respective location of the panel.

Figure 3:
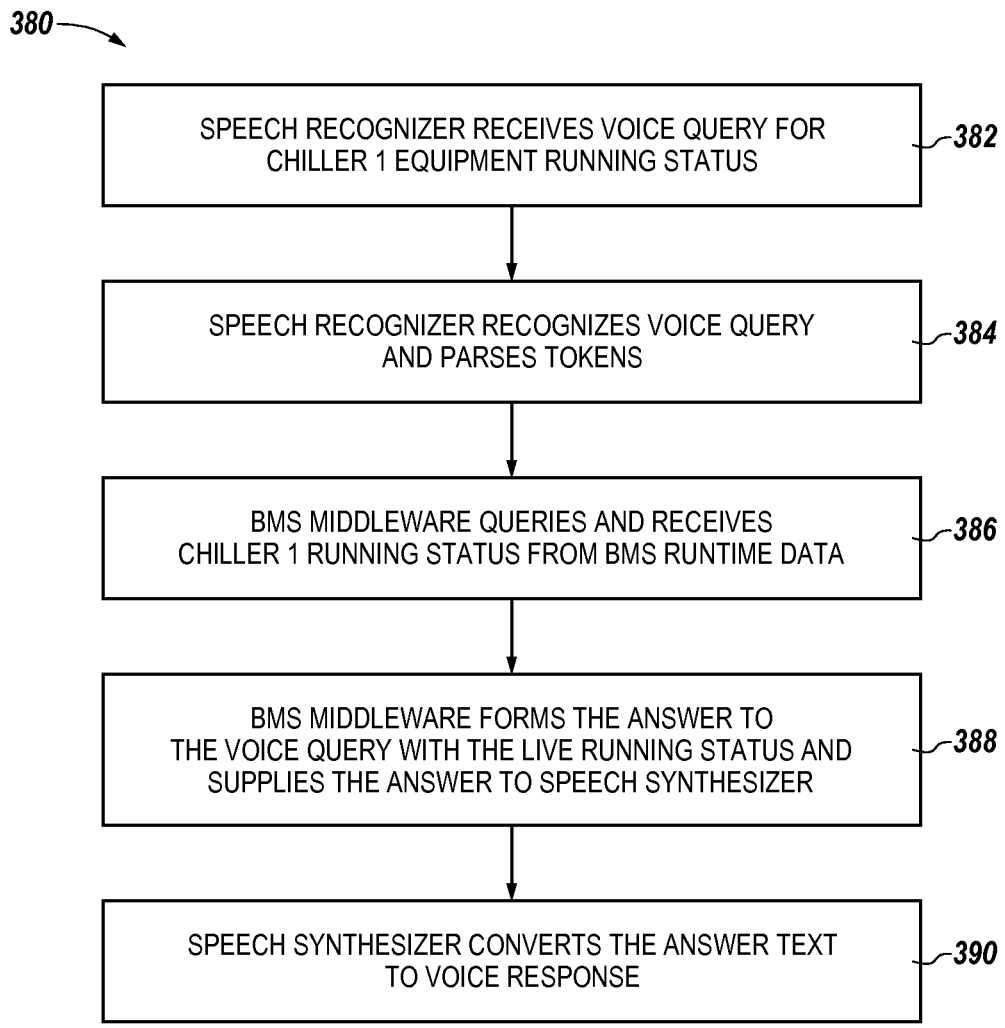
FIG. 3 illustrates a method for operating a voice-responsive building management system in accordance with one or more embodiments of the present disclosure.

FIG. 3 illustrates a method 380 for operating a voice-responsive BMS (e.g., voice-responsive BMS 100 previously described in connection with FIG. 1) in accordance with one or more embodiments of the present disclosure. Method 380 can provide the running status of equipment (e.g., chiller 1) associated with (e.g., managed by) the BMS by voice. Method 380 can be performed by, for example, dynamic grammar builder 104 and/or speech processing engine 106 (e.g., speech recognizer 122 and/or speech synthesizer 134) previously described in connection with FIG. 1.

At block 382 of method 380, the speech recognizer receives a voice query (e.g., from a user of the BMS) for chiller 1 equipment running status. At block 384 of method 380, the speech recognizer recognizes the voice query and parses tokens. At block 386 of method 380, BMS middleware (e.g., BMS middleware 139 previously described in connection with FIG. 1) queries and receives chiller 1 running status from BMS runtime data (e.g., runtime data 128 previously described in connection with FIG. 1). At block 388 of method 380, the BMS middleware forms the answer to the voice query with the live (e.g., current) running status and supplies the answer to the speech synthesizer. At block 390 of method 380, the speech synthesizer converts the answer text to a voice response that can be provided to the user (e.g., through a speaker of the BMS, such as speaker 138 previously described in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer readable medium for operating a voice-responsive building management system, wherein the computer readable medium has computer readable instructions stored thereon that are executable by a processor to:
   receive a speech card of a user, wherein the speech card of the user includes:
      speech training data of the user; and
      domain vocabulary for applications of the building management system for which the user is authorized;
   generate grammar from project configuration data associated with a building information model of the building management system, wherein:

the building information model is a three-dimensional building information model that includes building information modeling data associated with a building managed by the building management system; and the project configuration data includes terms specific to projects associated with the building management system;

receive a voice command or voice query from the user; and execute the voice command or voice query using the speech training data of the user, the domain vocabulary, and the grammar generated from the project configuration data associated with the building information model.

2. The computer readable medium of claim 1, wherein the project configuration data is pre-loaded into the building management system during installation of the building management system.

3. The computer readable medium of claim 1, wherein the instructions are executable by the processor to:

generate grammar from controller configuration data associated with the building management system; and execute the voice command or voice query using the grammar generated from the controller configuration data.

4. The computer readable medium of claim 3, wherein the controller configuration data is dynamically loaded into the building management system during runtime of the building management system.

5. The computer readable medium of claim 1, wherein the instructions are executable by the processor to:

generate grammar from runtime data associated with the building management system; and execute the voice command or voice query using the grammar generated from the runtime data.

6. A computer implemented method for operating a voice-responsive building management system, comprising:

receiving speech training data of a user and domain vocabulary for applications of the building management system for which the user is authorized;

generating grammar from controller configuration data associated with a building information model of the building management system, wherein:

the building information model is a three-dimensional building information model that includes building information modeling data associated with a building managed by the building management system; and the controller configuration data includes names of controllers associated with the building management system;

receiving a voice command or voice query from the user; and executing the voice command or voice query using the speech training data of the user, the domain vocabulary, and the grammar generated from the controller configuration data associated with the building information model.

7. The method of claim 6, wherein the method includes receiving the speech training data of the user and the domain vocabulary from a speech card issued to the user.

8. The method of claim 6, wherein the method includes receiving the speech training data of the user from a cloud-based computing system.

9. The method of claim 6, wherein executing the voice command or voice query includes displaying information associated with the voice command or voice query to the user.

10. The method of claim 6, wherein executing the voice command or voice query includes providing a voice response with information associated with the voice command or voice query to the user.

11. The method of claim 6, wherein:

the voice command or voice query includes a particular item associated with the building management system; and executing the voice command or voice query includes displaying the particular item and data associated with the particular item.

12. The method of claim 6, wherein:

the voice command or voice query includes a particular item associated with the building management system; and executing the voice command or voice query includes providing a voice response with data associated with the particular item.

13. The method of claim 6, wherein the method is performed without using the internet.

14. A non-transitory computer readable medium for operating a voice-responsive building management system, wherein the computer readable medium has computer readable instructions stored thereon that are executable by a processor to:

receive speech training data of a user and domain vocabulary for applications of the building management system for which the user is authorized;

generate grammar from runtime data associated with a building information model of the building management system, wherein:

the building information model is a three-dimensional building information model that includes building information modeling data associated with a building managed by the building management system; and the runtime data includes events and alarms that occur while the building management system is running;

receive a voice command or voice query from the user; and execute the voice command or voice query using the speech training data of the user, the domain vocabulary, and the grammar generated from the runtime data associated with the building information model.

15. The computer readable medium of claim 14, wherein the speech training data of the user includes speaker voice variations associated with the user.

16. The computer readable medium of claim 14, wherein the domain vocabulary includes:

a pronunciation lexicon for the user and the applications of the building management system for which the user is authorized; and grammar recognition for the user and the applications of the building management system for which the user is authorized.

17. The computer readable medium of claim 14, wherein:

the speech card includes a speech password; and the speech card includes details of the user.

18. The computer readable medium of claim 14, wherein the speech card is encrypted such that only the applications of the building management system for which the user is authorized can decrypt and use the speech card.

* * * * *